United States Patent
Jung et al.

(10) Patent No.: US 11,198,802 B1
(45) Date of Patent: Dec. 14, 2021

(54) TWO-PART ADHESIVE COMPOSITION THAT UNDERGOES A VISUAL CHANGE WHEN CURED

(71) Applicant: 3M INNOVATIVE PROPERTIES COMPANY, St. Paul, MN (US)

(72) Inventors: Adrian T. Jung, Kaarst (DE); Mareike Bardts, Hilden (DE); Dirk Hasenberg, Raeren (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/297,173

(22) PCT Filed: Dec. 18, 2019

(86) PCT No.: PCT/IB2019/061037
§ 371 (c)(1),
(2) Date: May 26, 2021

(87) PCT Pub. No.: WO2020/136511
PCT Pub. Date: Jul. 2, 2020

(30) Foreign Application Priority Data

Dec. 23, 2018 (EP) .................................. 18215816

(51) Int. Cl.
| | | |
|---|---|---|
| *C09J 163/00* | (2006.01) | |
| *C08G 59/24* | (2006.01) | |
| *C08G 59/54* | (2006.01) | |
| *C08G 59/50* | (2006.01) | |
| *C08G 59/56* | (2006.01) | |
| *C09J 9/00* | (2006.01) | |
| *C09J 5/06* | (2006.01) | |
| *C08K 5/00* | (2006.01) | |
| *C08L 63/00* | (2006.01) | |

(52) U.S. Cl.
CPC .......... *C09J 163/00* (2013.01); *C08G 59/245* (2013.01); *C08G 59/5013* (2013.01); *C08G 59/54* (2013.01); *C08G 59/56* (2013.01); *C08K 5/0041* (2013.01); *C08L 63/00* (2013.01); *C09J 5/06* (2013.01); *C09J 9/00* (2013.01); *C09J 2301/304* (2020.08); *C09J 2400/163* (2013.01); *C09J 2463/00* (2013.01)

(58) Field of Classification Search
CPC ....... C09J 9/00; C09J 9/005; C09J 9/02; C09J 163/00; C09J 163/04; C09J 163/06; C09J 163/08; C09J 163/10; C09J 2463/00; C09J 2463/008; C09J 2400/16; C09J 2400/163; C09J 2400/166; C09J 2301/304; C09J 2301/312; C09J 2301/40; C09J 2301/408; C09J 2301/50; C09J 5/00; C09J 5/06; C08K 5/0041
See application file for complete search history.

(56) References Cited

U.S. PATENT DOCUMENTS

| | | |
|---|---|---|
| 5,425,824 A | 6/1995 | Marwick |
| 6,000,118 A | 12/1999 | Biernat |
| 6,368,008 B1 | 4/2002 | Biernat |
| 6,528,176 B1 | 3/2003 | Asai |
| 2013/0096234 A1* | 4/2013 | Jung ........................ C08K 5/47 523/453 |
| 2019/0300760 A1 | 7/2019 | Makino |

FOREIGN PATENT DOCUMENTS

| | | | |
|---|---|---|---|
| EP | 0 342 965 | 11/1989 | |
| EP | 2 295 487 | 3/2011 | |
| EP | 3670564 A1 * | 6/2020 | ............. C08G 59/18 |
| JP | 56-92977 | 7/1981 | |
| JP | 2019-26798 | 2/2019 | |
| WO | WO 2005/030853 | 4/2005 | |
| WO | WO 2007/014039 | 2/2007 | |

(Continued)

OTHER PUBLICATIONS

EP18215816 Written Opinion, published Jun. 24, 2019. (Year: 2019).*

(Continued)

*Primary Examiner* — Christopher M Rodd
(74) *Attorney, Agent, or Firm* — Philip P. Soo

(57) ABSTRACT

The present disclosure provides a method for bonding parts, comprising the following steps (a) Providing a two-component adhesive composition precursor, comprising a first part (A) comprising at least one epoxy curing agent and preferably at least one first dye; a second part (B) comprising at least one second dye different from the at least one first dye and at least one epoxy resin; (b) Mixing part (A) and part (B) of the two-component adhesive composition precursor so as to obtain an adhesive composition; (c) Applying the adhesive composition onto a first part; (d) Applying a second part onto the adhesive composition applied to the first part; and then performing a first curing step at a first temperature, wherein the adhesive composition undergoes a first colour change; or (e) Performing a first curing step at a first temperature, wherein the adhesive composition undergoes a first colour change, and then applying a second part onto the adhesive composition applied to the first part; (f) Perform a second curing step at a second temperature higher than the first temperature, thereby fully curing the adhesive composition so as to obtain a structural adhesive bond between the first and second parts, wherein the adhesive composition undergoes a second colour change.

15 Claims, No Drawings

(56) References Cited

FOREIGN PATENT DOCUMENTS

| | | |
|---|---|---|
| WO | WO 2009/071269 | 6/2009 |
| WO | WO 2011/141148 | 11/2011 |
| WO | WO 2012/003204 | 1/2012 |
| WO | WO 2012/166257 | 12/2012 |
| WO | WO 2014/031838 | 2/2014 |
| WO | WO 2017/001592 | 1/2017 |
| WO | WO 2018/008742 | 1/2018 |
| WO | WO 2018/167551 | 9/2018 |

OTHER PUBLICATIONS

International Search Report for PCT/IB2019/061037 dated Jul. 7, 2020 (3 pages).
EP Search Report for EP18215816 dated Jun. 14, 2019 (2 pages).

* cited by examiner

TWO-PART ADHESIVE COMPOSITION THAT UNDERGOES A VISUAL CHANGE WHEN CURED

CROSS REFERENCE TO RELATED APPLICATIONS

This application is a national stage filing under 35 U.S.C. 371 of PCT/IB2019/061037, filed 18 Dec. 2019, which claims the benefit of EP Patent Application No. 18215816.2, filed 23 Dec. 2018, the disclosures of which are incorporated by reference in their entirety herein.

TECHNICAL FIELD

The present disclosure relates to a method for bonding parts, comprising the use of a two-part adhesive composition which undergoes two colour changes during the bonding process. Furthermore, the present disclosure relates to a bonded assembly, obtained by the method described herein, and a curable two-components structural adhesive composition.

BACKGROUND

Metal joints in vehicles may be formed through the use of an adhesive. For example, an adhesive may be used to bond a metal panel, for example a roof panel to the support structure or chassis of the vehicle. Further, an adhesive may be used in joining two metal panels of a vehicle closure panel. Vehicle closure panels typically comprise an assembly of an outer and an inner metal panel whereby a hem structure is formed by folding an edge of an outer panel over an edge of the inner panel. Typically, an adhesive is provided there between to bond the panels together. Further, a sealant typically needs to be applied at the joint of the metal panels to provide for sufficient corrosion resistance. For example, U.S. Pat. No. 6,000,118 discloses the use of a flowable sealant bead between the facing surfaces of the two panels, and a thin film of uncured paint-like resin between a flange on the outer panel and the exposed surface of the inner panel. The paint film is cured to a solid impervious condition by a baking operation performed on the completed door panel. U.S. Pat. No. 6,368,008 discloses the use of an adhesive for securing two metal panels together. The edge of the joint is further sealed by a metal coating. WO 2009/071269 discloses an expandable epoxy paste adhesive as a sealant for a hem flange. A further hemmed structure is disclosed in U.S. Pat. No. 6,528,176.

Further efforts have been undertaken to develop adhesive compositions whereby two metal panels, in particular an outer and an inner panel of a vehicle closure panel, could be joined with an adhesive without the need for a further material for sealing the joint. Thus, it became desirable to develop adhesive systems that provide adequate bonding while also sealing the joint and providing corrosion resistance. A partial solution has been described in e.g. WO 2007/014039, which discloses a thermally expandable and curable epoxy-based precursor of an expanded thermoset film toughened foamed film comprising a mixture of solid and liquid epoxy resins, and claimed to provide both favorable energy absorbing properties and gap filling properties upon curing. Another partial solution has been described in WO 2011/141,148, which describes a heat activated structural adhesive that is solid and dry to the touch at ambient temperature, that can be activated to develop adhesive properties at an elevated temperature and which can be moulded without curing.

Furthermore, another relevant aspect is the form of the adhesives used. For example, it is known that a lot of applications in automotive production processes are based on one-component structural bonding solutions. These products are mainly used since they do not require any mixing and may be applied in the required quantity on one of the surfaces that will be part of the later joint. Because of this, one-component adhesives are considered in at least some part of the prior art as "easy-to-use"-adhesives. For example, after applying adhesive onto a first part and subsequent positioning of the second part onto the adhesive on the first part, the parts are fixed and the adhesive is cured at elevated temperatures. In a lot of processes in automotive industry, this curing at elevated temperatures may be carried out in subsequent production steps, such as curing the paint in paint bake ovens. However, it is also known that a large number of parts may be subject to deformations during these processes which require re-work or may even lead to the complete rejection of the part. It is assumed that this may be due to the bond being formed at the greatest mismatch of the thermal elongation of the parts (including the adhesive) having different thermal behaviour.

Thus, in another approach, two-component structural adhesives are employed for various process in assembly lines in the automotive industry. For example, the two-component adhesive is applied after pre-mixing and, after connection with a second part, a pre-reacting curing step may be carried out at ambient temperatures. This may then be followed by a short heating step to allow for short fixation times and may offer the additional advantage of reduced risk of displacement of connected or bonded parts during transportation or subsequent manufacturing processes. Heat is often applied via induction. However, even today it is challenging to control the induction step in all aspects to guarantee the function of the part in good confidence.

For these reasons, there exists desire from industry for methods for bonding parts and adhesive compositions which allow for precise, economic and secure bonding of parts during assembly and manufacture operations such as body-in-white or hem flange-processes.

SUMMARY

The present disclosure provides a method for bonding parts, comprising the following steps
(a) Providing a two-component adhesive composition precursor, comprising
a first part (A) comprising at least one epoxy curing agent and preferably at least one first dye;
a second part (B) comprising at least one second dye different from the at least one first dye and at least one epoxy resin;
(b) Mixing part (A) and part (B) of the two-component adhesive composition precursor so as to obtain an adhesive composition;
(c) Applying the adhesive composition onto a first part;
(d) Applying a second part onto the adhesive composition applied to the first part; and then Performing a first curing step at a first temperature, wherein the adhesive composition undergoes a first colour change; or
(e) Performing a first curing step at a first temperature, wherein the adhesive composition undergoes a first colour change, and then Applying a second part onto the adhesive composition applied to the first part;

(f) Perform a second curing step at a second temperature higher than the first temperature, thereby fully curing the adhesive composition so as to obtain a structural adhesive bond between the first and second parts, wherein the adhesive composition undergoes a second colour change.

Furthermore, the present disclosure relates to a bonded assembly, obtained by the method as described herein.

Finally, the present disclosure relates to a two-components structural adhesive composition precursor, comprising
(a) a first part (A) comprising
  (i) preferably, at least one dye; and
  (ii) at least one epoxy curing agent;
(b) a second part (B) comprising
  (i) at least one second dye; and
  (ii) at least one epoxy resin.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. As used herein, the term "a", "an", and "the" are used interchangeably and mean one or more; and "and/or" is used to indicate one or both stated cases may occur, for example A and/or B includes, (A and B) and (A or B). Also herein, recitation of ranges by endpoints includes all numbers subsumed within that range (e.g., 1 to 10 includes 1.4, 1.9, 2.33, 5.75, 9.98, etc.). Also herein, recitation of "at least one" includes all numbers of one and greater (e.g., at least 2, at least 4, at least 6, at least 8, at least 10, at least 25, at least 50, at least 100, etc.). Also, it is to be understood that the phraseology and terminology used herein is for the purpose of description and should not be regarded as limiting. Contrary to the use of "consisting", which is meant to be limiting, the use of "including," "containing", "comprising," or "having" and variations thereof is meant to be not limiting and to encompass the items listed thereafter as well as additional items.

Amounts of ingredients of a composition may be indicated by % by weight (or "% wt". or "wt.-%") unless specified otherwise. The amounts of all ingredients gives 100% wt unless specified otherwise. If the amounts of ingredients is identified by % mole the amount of all ingredients gives 100% mole unless specified otherwise.

In the context of the present disclosure, the terms "room temperature" and "ambient temperature" are used interchangeably and refer to a temperature of 23° C. (±2° C.) at ambient pressure condition of about 101 kPa.

Unless explicitly stated otherwise, all embodiments and optional features of the present disclosure can be combined freely.

The first aspect of the present disclosure is a method for bonding parts, comprising the comprising the following steps
(a) Providing a two-component adhesive composition precursor, comprising
  a first part (A) comprising at least one epoxy curing agent and preferably at least one first dye;
  a second part (B) comprising at least one second dye different from the at least one first dye and at least one epoxy resin;
(b) Mixing part (A) and part (B) of the two-component adhesive composition precursor so as to obtain an adhesive composition;
(c) Applying the adhesive composition onto a first part;
(d) Applying a second part onto the adhesive composition applied to the first part; and then Performing a first curing step at a first temperature, wherein the adhesive composition undergoes a first colour change; or
(e) Performing a first curing step at a first temperature, wherein the adhesive composition undergoes a first colour change, and then Applying a second part onto the adhesive composition applied to the first part;
(f) Perform a second curing step at a second temperature higher than the first temperature, thereby fully curing the adhesive composition so as to obtain a structural adhesive bond between the first and second parts, wherein the adhesive composition undergoes a second colour change.

This method according to the present disclosure provides at least one property advantageous for bonding parts, in particular in assembly and bonding operations in the automotive industry. That is, using a two-component structural adhesive in combination with the first and second dye, and the first colour change in the first curing step and the second colour change in the second curing step may give rise to at least one, preferably all of the following advantages: Controlled application of adhesive of the at least one part, first and second parts secured in position after the first curing step during subsequent transportation and/or manufacturing processes, strong bond after fully cured adhesive, easy handling and long shelf life of two component adhesive composition precursor, and the ability to monitor the curing process by checking whether respective colour changes had actually taken place, thereby good control of the curing process and good and easy quality control of bonded parts. Also, performing a first curing step after the adhesive has been applied onto the first substrate may be advantageous in that the adhesive may be at is partially cured onto the first substrate. Thus, the adhesive will be fixed on the first substrate, even when oil or grease present on the surface, but the adhesive will remain tacky and elastic on the second surface. This will allow for a certain process window in which the first substrate may be moved or formed in a production cycle. Further, the elastic and tacky adhesive may prevent spring-back after a hemming step in a process for forming a hem flange as common in automotive industries. This combination of properties makes the method as described herein excellently suited for bonding operations in the automotive industry such as body-in-white and hem-flange processes.

The term "colour change" has the common meaning in the art, i.e. the visible change of the colour of a material into a different colour. That is, the second colour after the colour change is clearly different from the first colour before the colour change. Hence, it is also preferred that the adhesive composition obtained after mixing of part (A) and part (B) exhibits a first colour, which changes into a second colour after the first colour change, and this second colour changes into a third colour after the second colour change. For example, a colour change may take place from yellow to green, from green to yellow, from blue to orange, from orange to blue, from green to red, from red to green, and the like. Also, it is preferred if only the second dye is present, that there is a colour change after the first curing step. This will give an indication to the skilled person whether and to what extent curing has taken place. For instance, when curing takes place via induction curing, a curing gradient is established between the first substrate/adhesive interface and the surface of the adhesive opposite the substrate/adhesive surface (which may also be called "open adhesive surface"). This curing gradient may be made visible with the at least one second dye being present.

In this regard, it is preferred that the first and/or second dye is able to undergo a colour change. That is, it is preferred that the first dye or the second dye are able to undergo a colour change. It is also preferred that the second dye has a different colour than the first dye, i.e. the colour of the second dye is different from the colour of the first dye. "A different colour" has the meaning common in the art, i.e. a clearly and visible different colour. For instance, the second colour may be red, and the first colour may be blue, or vice versa. Preferred are combinations of colours of first and second dyes which yield a third colour upon mixing. This has the advantage that proper mixing of first part (A) and second part (B) of the adhesive composition precursors as described herein may be easily monitored during the method according to the present disclosure. In a particular preferred example, the at least one first dye is yellow and the at least one second dye is blue (or vice versa). This will have the effect that upon mixing of parts (A) and (B) of the adhesive composition precursor, the resulting adhesive composition will be green. Thus, proper mixing of parts (A) and (B) of the precursor and the resulting proper formation of the desired adhesive composition can be securely and reproducibly monitored. Furthermore, a first colour change in the first curing steps indicates in a secure, simple and reproducible manner that this curing step was completed. The same is true for the second colour change in the second curing step. Preferably, the first dye is yellow and the second dye is blue. Thus, the colour obtained after mixing parts (A) and (B) is green. In this regard, it is preferred that the first colour change is from green to red, and the second colour change is from red to yellow, from red to blue, or from red to green, preferably from red to green. In this regard, it may be that the green colour obtained after the second colour change is of a different shade than the green colour of the curable adhesive composition before the first colour change. Alternatively, the first colour change may be from orange to blue, from blue to orange, from yellow to red, from red to yellow, from red to green, or from yellow to blue, and vice versa. The same colour changes may be noted and preferred for the second colour change, provided that the first and second colour changes may not be the same. Also, when only one dye is present, preferably the at least one second dye in part (B) of the adhesive composition as disclosed herein, it is preferred that the at least one second dye undergoes a colour change upon curing, preferably upon heating. That is, colour change may be from orange to blue, from blue to orange, from yellow to red, from red to yellow, from red to green, or from yellow to blue, and vice versa.

With regard to either or both first and second dyes being able to undergo a colour-change, it is preferred that the first/or second dye is selected from halochromic dyes. The term "halochromic dye" as used herein describes a compound which exhibits halochromic properties. That is, it refers to compounds which are able to reversibly change their colour in the presence of a factor, which is in most case change in pH in the medium surrounding the halochromic compound. Therefore, a lot of halochromic dyes are also known as pH-indicators and find various applications in chemistry, be in industry or science. Preferably, the first or second dye are selected from halochromic dyes, more preferably, the first dye is selected from halochromic dyes. Basically, any known halochromic dye may be used. Since certain halochromic dyes known as azo dyes appeared to give the best and reproducible results, azo dyes are preferred in the context of the present disclosure. That is, it is preferred that the at least one first dye and/or the at least one second dye is selected from azo dyes. It is also preferred that the at least one first or the at least one second dye is selected from azo dyes. In general, any known azo dye may be at least contemplated for use herein. Preferably, the azo dyes are selected from selected from methyl red, methyl orange, cresol red, eriochrome black T, thymol blue, bromothymol blue, and arylide yellow, preferably methyl red, methyl orange, cresol red and arylide yellow.

If only one of first dye and second dye is a halochromic dye, it is preferred that the corresponding other dye is a non-halochromic dye. That is, a dye which does not change its colour in the method as disclosed herein. For this purpose, the first or second dye is preferably selected from organic dyes, inorganic pigments, organic pigments, wherein organic dyes such as indanthrone or yellow 74 are preferred for use herein.

With regard to the two-part adhesive composition precursor, it relates to the field of adhesive compositions known as structural adhesives or simply epoxy adhesives. Adhesives of this kind confer strong and highly stable adhesive bonds between various materials, such as composite materials and, in particular, metals. Curable adhesive composition precursors as the one according to the present disclosure are also known as 2-component compositions or 2k-compositions. It is understood that the first part (A) is physically separated from the second part (B) of the curable adhesive composition precursor. The first part (A) and second part (B) are mixed before the intended use according to the user's needs so as to obtain a curable composition. The present disclosure also covers a curable adhesive composition, obtained from the curable adhesive composition precursor and a cured composition obtained from curing the curable composition. The use of these 2k-compositions offers several advantages such as a longer shelf-life, the possibility to form a curable composition according to the user's needs, and a readily curable composition which itself offers further handling advantages for the user.

The epoxy resin for use herein is not particularly limited. Epoxy resins are polymers having one or more epoxy-functionality. Typically but not exclusively, the polymers contain repeating units derived from monomers having an epoxy-functionality but epoxy resins can also include, for example, silicone-based polymers that contain epoxy groups or organic polymer particles coated with or modified with epoxy groups or particles coated with, dispersed in, or modified with epoxy-groups-containing polymers. The epoxy-functionalities allow the resin to undertake cross-linking reactions. The epoxy resins may have an average epoxy-functionality of at least 1, greater than one, or of at least 2.

Any epoxy resins well known to those skilled in the art may be used in the context of the present disclosure. Epoxy resins may be aromatic, aliphatic, cycloaliphatic or mixtures thereof. In a typical aspect, the epoxy resins for use herein are aromatic. Preferably, the epoxy resins contain moieties of the glycidyl or polyglycidyl ether type. Such moieties may be obtained, for example, by the reaction of a hydroxyl functionality (for example but not limited to dihydric or polyhydric phenols or aliphatic alcohols including polyols) with an epichlorohydrin-functionality. As referred to herein, dihydric phenols are phenols containing at least two hydroxy groups bonded to the aromatic ring (also referred to as "aromatic" hydroxy groups) of a phenol—or in case of polyphenols at least two hydroxy groups are bonded to an aromatic ring. This means the hydroxyl groups can be bonded to the same ring of the polyphenol or to different rings each of the polyphenol. Therefore, the term "dihydric phenols" is not limited to phenols or polyphenols containing two "aromatic" hydroxy groups but also encompasses polyhydric phenols, i.e. compounds having more than two "aromatic" hydroxy groups.

Examples of useful dihydric phenols include resorcinol, catechol, hydroquinone, and polyphenols including p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, 2,2-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenyl-methane, dihydroxydiphenyltolylethane, dihydroxydiphenyltolylmethylmethane, dihydroxydiphenyldicyclohexylmethane, and dihydroxydiphenylcyclohexane.

Preferred epoxy resins include epoxy resins containing or consisting of glycidyl ethers or polyglycidyl ethers of dihydric or polyhydric phenols, such as, for example, but not limited to bisphenol A, bisphenol F and combinations thereof. They contain one or more repeating units derived from bisphenol A and/or F. Such ethers, or such repeating units are obtainable, for example, by a polymerization of glycidyl ethers of bisphenol A and/or F with epichlorohydrin. Epoxy resins of the type of diglycidyl ether of bisphenol A can be represented by the formula (1) wherein n denotes the repeating unit (in case of n=0 the formula below represents the diglycidyl ether of bisphenol A):

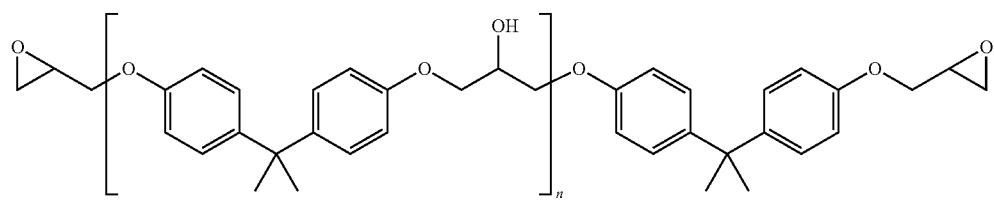

Formula (1)

Typically, the epoxy resins are blends of several resins. Accordingly, n in the formula above may represent an average value of the blend, and may not be an integer but may include values like, for example and not limited thereto, 0.1 to 2.5.

Instead of, or in addition to, using the aromatic epoxy resins described above also their fully or partially hydrogenated derivatives (i.e. the corresponding cycloaliphatic compounds) may be used. Instead of, or in addition to using aromatic epoxy resins also aliphatic, for example acyclic, linear or branched, epoxy resins may be used.

Typically, the epoxy resin is liquid. The epoxy resins may include solid epoxy resins, used in dissolved form, or dispersed, for example in another liquid resin. Preferably, the epoxy resin is liquid at ambient conditions (23° C., 1 bar). The epoxy resins may contain halogens, preferably bromine atoms to make them less flammable. Preferably, the at least one epoxy resin is selected from phenolic epoxy resins, bisphenol epoxy resins, hydrogenated epoxy resins, aliphatic epoxy resins, halogenated bisphenol epoxy resins, novolac epoxy resins, and any combinations and mixtures thereof.

Examples of suitable and commercially available epoxy resins include diglycidylether of bisphenol A (available under the trade designation EPON 828, EPON 830, EPON 1001 or EPIKOTE 828 from Hexion Speciality Chemicals GmbH, Rosbach, Germany, or under the trade designation D.E.R-331 or D.E.R-332 from Dow Chemical Co); diglycidyl ether of bisphenol F (e.g. EPICLON 830 available from Dainippon Ink and Chemicals, Inc. or D.E.R.-354 from Dow Chemical Co, Schwalbach/Ts., Germany); diglycidyl ethers of a blend of bisphenol A and bisphenol F (e.g. EPIKOTE 232 available from Momentive Speciality Chemicals, Columbus, USA). Other epoxy resins based on bisphenols are commercially available under the trade designations EPI LOX (Leuna Epilox GmbH, Leuna, Germany); flame retardant epoxy resins are available under the trade designation D.E.R 580 (a brominated bisphenol type epoxy resin available from Dow Chemical Co.). Cycloaliphatic epoxy resins are commercially available under the trade designation EPINOX (Hexion Specialty Chemicals GmbH). With regard to the amount of the at least one epoxy resin in part (B) of the adhesive composition precursor as described herein, it is preferred that the at least one epoxy resin is contained in part (B) in an amount in the range of from 15 to 75 wt.-%, preferably from 20 to 70 wt.-%, more preferably from 25 to 65 wt.-%, based on the total weight of part (B).

Similarly, any epoxy curing agent known in the art may be used in general in part (A) of the adhesive composition precursor according to the present disclosure. Epoxy curing agents suitable for use in the present disclosure are compounds which are capable of cross-linking (curing) the epoxy resin. Suitable curing agents according to the present invention may be primary or secondary amines. Furthermore, it is preferred that the curable adhesive composition comprises in part (A) at least one second amine epoxy curing agent. This may have the effect of improved mechanical strength of the cured coatings such as shear strengths on composites and/or Shore D hardness. In this regard, it is preferred that the at least one first epoxy and/or the at least one second epoxy curing agent is selected from primary amines, secondary amines, and any combinations and mixtures thereof. Preferably, the at least one first epoxy curing and/or the at least one second epoxy curing agent in part (A) of the curable adhesive composition precursor are selected from aliphatic amines, cycloaliphatic amines, aromatic amines, aromatic compounds having at least one amino moiety, polyamines, polyamine adducts, polyetheramines, polyamidoamines, dicyandiamides, and any combinations and mixtures thereof. In this regard, it is preferred that the at least one first epoxy curing agent is selected from polyamidoamines, polyetheramines, and/or polyamines.

Exemplary polyether amines suitable for use herein are commercially available under the trade designation JEFFAMINE from Huntsman Chemicals, or TTD (4,7,10-trioxatridecane-1,13-diamine) commercially available, for example, from BASF, Ludwigshafen Germany. The polyamidoamine may be branched or unbranched aromatic or branched or unbranched aliphatic. Preferably, the polyamidoamine is an aliphatic polyamidoamine. Polyamidoamines which may be advantageously used in the context of the present disclosure are obtained as described in [0010] to [0029] of EP 249527 A1, the disclosure of which is incorporated herein by reference.

It is preferred that the at least one epoxy curing agent is contained in part (A) of the curable adhesive precursor as described herein in an amount of from 30 to 80 wt.-%, preferably from 35 to 75 wt.-%, more preferably in the range of from 40 to 70 wt.-%, based on the total weight of part (A).

According to an advantageous aspect of the present disclosure, part (A) of the coating composition precursor as described herein comprises at least one curing accelerator. curing accelerator are not epoxy curing agents, i.e. they are not necessarily incorporated into the crosslinked network of the epoxy resins. Rather, they may accelerate the crosslinking reactions and may therefore also be called in the art secondary epoxy curatives, curing aids or curing accelerators. In this regard, it is preferred that part (A) comprises at least one first curing accelerator and at least one second curing accelerator distinct from the first curing accelerator. Distinct in this regard means "chemically distinct", i.e. being a different compound. Using such a combination of first and second epoxy curing accelerator as described herein has the effect of reducing the curing time of the curable adhesive composition obtained from combining part (A) and part (B) of the curing composition precursor according to the present disclosure. That is, for many applications, in particular in automotive industry where during manufacture of a vehicle or parts of vehicles great numbers of parts or assemblies are processed, short curing times are at least desirable, if not required. It is further preferred that the at least one first curing accelerator as described herein is a metal salt. This may have the effect of an increased curing speed, which is very advantageous in many applications, e.g. in coating and sealing connecting parts in the aerospace or automotive manufacturing industry. Accordingly, curing at ambient temperature, together with good mechanical strength of the bond obtained may be achieved.

Preferably, the metal in the metal salt catalyst is selected from the group consisting of alkali, earth alkali, rare earth metals, aluminium, preferably from alkali and earth alkali, more preferably from alkaline earth, even more preferably from calcium, caesium, strontium, and magnesium. The anion is preferably selected from nitrate, nitrite and organic acid anion, preferably sulfates and triflates, more preferably triflates, of which nitrates and triflates are particularly preferred. Nitrates are strongly preferred. It was found that the combination of the second epoxy curative and the first epoxy curative, in particular the metal salt, gives rise to an increase in curing speed. In this regard, metal salt catalyst selected from the group consisting of calcium nitrate, calcium triflate, aluminium nitrate, magnesium nitrate, lithium nitrate, potassium nitrate, sodium nitrate, and any combinations thereof is preferred. The use of calcium nitrate, magnesium nitrate, calcium triflate, and any combinations thereof is preferred, with particular preference on calcium nitrate. Without wanting to be bound to theory, it is believed that the metal salt thickens the material and therefore influences the viscosity of the part (A) of said adhesive composition precursor in a positive way. For example, it is highly advantageous and therefore preferred that the second epoxy curative is tris-(dimethylaminomethyl) phenol and the first epoxy curative is calcium nitrate, magnesium nitrate, calcium triflate and any combinations thereof, preferably calcium nitrate.

It is preferred that the at least one curing accelerator is contained in part (A) in an amount of from 1 to 30 wt.-%, preferably from 5 to 25 wt.-%, more preferably from 10 to 20 wt.-%, based on the total weight of part (A).

The curable adhesive composition precursor may further comprise in part (A) and/or in part (B) at least one toughening agents. Any toughening agent, commonly known in the art, may be used in the context of the present disclosure. The toughening agents are preferably selected from a group comprising core-shell toughening agents, CTBNs (carboxyl and/or nitrile terminated butadiene/nitrile rubbers) and high molecular weight amine terminated polytetramethylene oxide.

Core-shell toughening agents which are especially preferred as toughening agents, usually comprise different materials in the inner core region and the outer shell region, respectively. Preferably, the core may be harder than the shell but this is not required. The shell may comprise harder material and/or the shell may be layered in its construction. Most preferably, the inner hard core component is comprised of a single and/or a plurality of organic polymers and inorganic oxides from the first, second and/or third transition series of the periodic table such as silica, alumina, zirconia, and/or naturally occurring minerals such as feldspars, silicates, aluminates, zirconates, and/or other hardened materials such as carbides, nitrides, silicides, aluminides, and/or some combination thereof and therebetween. The outer soft shell component may be comprised of rubbers such as diene, olefin rubbers, natural rubber, polyisoprene, copolymers thereof, ethylene propylene monomer rubber, diene-acrylonitrile copolymers, copolymers of vinyl aromatic monomers, styrene-butadiene copolymers known as SBR rubbers, and terpolymers of dienes with acrylonitrile or unsaturated esters and styrene or vinyl toluene. The soft shell preferably includes modifications with functionalities such as carboxyl, hydroxyl, epoxy, cyanates, isocyanates, amino, and thiol which can react with the epoxy components of the precursor. Core-shell toughening agents which are useful in the thermosettable composition are commercially available, for example, from DOW under the trade designation Paraloid™, or Kane Ace™ MX153 from Kaneka, or Clearstrength™ products from Arkema Alternative core shell material are acrylic impact modifiers from Arkema, with products from the trade name Durastrength. Usually, core-shell toughening agents will be employed as dispersion in epoxy resins.

CTBN toughening agents react through their carboxyl and/or nitrile functional groups with the epoxide component of the precursor during curing thereby introducing their butadiene/nitrile rubber portion as a soft, shock-absorbing segment into the epoxy network forming a hard segment. CTBN toughening agents which are useful in the present invention are commercially available, for example, from Hanse Chemie AG, Hamburg, Germany, under the trade designation Albipox™.

Preferably, the at least one toughening agent is contained in part (A) and/or part (B) of the curable adhesive composition precursor as described herein in an amount of from 1 to 50 wt.-%, preferably from 5 to 45 wt.-%, more preferably from 10 to 40 wt.-%, based on the total weight of part (A) or part (B), respectively.

Furthermore, it is preferred that part (A) and/or part (B) of the curable adhesive composition precursor comprise at least one filler material. Filler materials useful in adhesive compositions are known in the art and may be preferably selected from mineral fillers, silica and glass beads. Silica compounds may have the effect of giving rise to improved flow, improved workability and increased of the compositions as described herein, without sacrificing mechanical strength or resistance to water and the like of the cured coatings obtained therefrom. In this regard, it is preferred that the at least one silica compound is selected from fused silica, fumed silica, perlite, and any combinations and mixtures thereof. Silica compounds as described herein may preferably be employed in the form of silica particles. Preferably, the silica particles comprise fumed silica, preferably hydrophobically fumed silica, fused silica, amorphous silica particles, hollow silica particles, silica gels, calcium silicates, and any combinations thereof. Exemplary commercial fillers include SHIELDEX AC5 (a synthetic amorphous silica, calcium hydroxide mixture available from W.R. Grace in Columbia, Md., USA); CAB-O-SIL TS 720 (a hydrophobic fumed silica-treated with polydimethyl-siloxane-polymer available from Cabot GmbH in Hanau, Germany); AEROSIL VP-R-2935 (a hydrophobically fumed silica available from Degussa in Düsseldorf, Germany); AEROSIL R-202 (a hydrophobically fumed silica available from Evonik Industries, Germany); glass-beads class IV (250-300 microns): amorphous silica (available from 3M Deutschland GmbH in Neuss, Germany); MINSIL SF 20 (available from Minco Inc., 510 Midway, Tenn., USA); amorphous, fused silica; and APYRAL 24 ESF (epoxysilane-functionalized (2 wt.-%) aluminium trihydrate available from Nabaltec GmbH in Schwandorf, Germany). Fused silica is available, for example, under the trade designation MINSIL from Minco Inc., Midway, USA. It is preferred that the at least one filler material is contained in part (A) in an amount of at least 5 to 50 wt.-%, preferably in an amount of from 10 to 45 wt.-%, more preferably from 15 to 40 wt.-%, based on the total weight of part (A). Similarly, it is preferred that the at least one filler material is contained in part (B) in an amount of from 1 to 40 wt.-%, preferably from 5 to 35 wt.-%, more preferably from 10 to 30 wt.-%, based on the total weight of part (B).

It is further preferred that part (A) and/or part (B) of the curable adhesive composition precursor as described herein comprise at least one thermoplastic resin. The inclusion of thermoplastic resin may add to the film-forming properties of the curable adhesive composition as described herein, which may be advantageous during the method as described herein in that the composition may be applied as adhesive strip, film or even tape. Preferably, the at least one thermoplastic resin has a softening point measured by Differential Scanning Calorimetry (DSC) of from 60° C. to 140° C. It is also preferred that the at least one thermoplastic resin is selected from polyether thermoplastic resins, polypropylene thermoplastic resins, polyvinyl chloride thermoplastic resins, polyester thermoplastic resins, polycaprolactone thermoplastic resins, polystyrene thermoplastic resins, polycarbonate thermoplastic resins, polyamide thermoplastic resins, and any combinations and mixtures thereof. Polyether thermoplastic resins may give rise to the best results, hence, it is preferred that the at least one thermoplastic resin is selected from polyether thermoplastic resins, preferably from polyhydroxyether thermoplastic resins. In this regard, it is preferred that the polyhydroxyether thermoplastic resin is selected from phenoxy resins, polyether diamine resins, polyvinylacetal resins such as polyvinylbutyral resins, and any combinations and mixtures thereof. Preferably, the polyhydroxyether thermoplastic resin is selected from phenoxy resins. Examples of suitable polyvinylacetal resins for use herein include Vinyl Chloride/Vinyl Acetate Copolymers, Carboxyl-Modified Vinyl Copolymers, and Hydroxyl-Modified Vinyl Copolymers, commercially available from Dow Chemicals. Suitable thermoplastic resins for use herein are commercially available from InChem Corporation under trade designation PKHP, PKHH, PKHA, PKHB, PKHC, PKFE, PKHJ, PKHM-30 or PKHM-301, PKCP. Preferably, the at least one thermoplastic resin is contained in part (B) in an amount of from 1 to 40 wt.-%, preferably from 5 to 35 wt.-%, more preferably from 10 to 30 wt.-%, based on the total weight of part (B) of the curable adhesive composition precursor as described herein.

With regard to the ratio of part (A) and part (B) in the curable adhesive composition precursor as described herein, it is preferred that it is in the range of from 10:1 to 1:10, preferably from 5:1 to 1:8, more preferably from 2:1 to 1:6.

Part (A) and part (B) are mixed to obtain an adhesive composition. Mixing may be effectuated by means common known in the art, such as simple stirring, by co-extruding both parts, preferably through a mixing nozzle, and the like. Extruding and mixing may be carried out manually or automatically, and may be computer-controlled in this case. This has the advantage that amount and speed of fabrication of adhesive composition may be directly and effectively controlled and adapted to various process parameters and necessities. For instance, the application of the adhesive composition onto a first part may be directly effectuated in one step together with the mixing step. In this case, it is preferred to co-extrude part (A) and part (B) through a mixing nozzle and directly onto at least part of at least one surface of a first part (i.e., a first substrate). That is, the adhesive may be applied onto the at least one surface of a first substrate as a drop, bead of film. For example, the film may have a thickness in the range of from 0.05 to 2 mm, preferably from 0.1 to 1.5 mm. This may be advantageous, for example, for use in a hem flanging process. Partially curing the adhesive in a first curing step will then securely adhere the adhesive onto the first substrate, even when oil and/or grease is present, and provide for a flexible and/or tacky open surface. This may prevent the undesired springback effect often encountered in hem-flange processes in the automotive industry. As an alternative, the adhesive composition may be applied via a brush or by doctor blade, knife coating, master blade or even by spraying. However, the adhesive composition may be mixed and extruded (for instance, by means of a mixing nozzle) so as to obtain an adhesive strip, adhesive film or adhesive tape. This adhesive strip, film or tape may then be applied onto at least part of at least one surface of the first part, i.e. the first substrate. Providing and using the adhesive composition as described herein in the form of a strip, film or tape has the advantage that it may be applied by automated or robotic means, which may accelerate the process of application considerably (compared to, for instance, manual application) and allow for large industrial applications. This is of particular advantage in various applications in the automotive industry such as hem-flange-bonding and/or body-in-white-applications, where large numbers of parts are bonded together and further processed.

Next, the second part or substrate is applied onto the adhesive composition applied to the first part or substrate. That is, the adhesive composition will then be between the first substrate and the second substrate. At this point, a first curing step is performed at a first temperature, wherein the adhesive composition undergoes a first colour change. The first curing step comprises a pre-curing or a partial curing of the adhesive composition, but not a point where the adhesive composition is fully cured. Fully curing of the adhesive composition such as to obtain an adhesive bond between the first and the second parts or substrate is carried out in a subsequent and separate step and preferably at a higher temperature than in the first curing step. The second curing step may be carried out at a much later point in time and in a different location than the first curing step. This offers the advantage that the first and second part may be pre-bonded and secured into a fixed position in the first curing step, and then be transported to different locations and further processed in various process steps such as coating, lacquering, painting, welding, bolting, drilling, and the addition of further parts, and the like.

Heating during the first and/or second curing step may be carried out by various means known to the skilled person. In particular, heating steps already present in existing assembly processes e.g. in the automotive industry may be exploited for this purpose. For instance, the second curing step may take place in parallel to the curing of paint or coating in the paint bake oven used in automotive industries. The first and second colour changes, together with the first and second dyes used in the adhesive composition as described herein may be adapted to these already existing process steps and the corresponding temperatures. The advantage of the first and second colour changes taking place is that the correct bonding may be visually monitored. Therefore, it allows for a reproducible and reliable check-up whether the parts have successfully been bonded by means of the structural adhesive described herein. This is a particular advantage compared to known processes in the prior art, wherein bonded parts need to be checked, and sometimes broken up in order to verify the efficacy of bonding operations. Thus, it is preferred that the first and/or second curing step comprises heating treatment selected from induction heating, convection heating, IR heating, ultrasonic treatment, microwave heating, laser treatment, welding treatment and/or resistive heating, joule heating, ohmic heating, and any combination therefrom. Preferably, the first curing step comprises induction heating, laser treatment, and/or resistive heating, joule heating, ohmic heating, preferably induction heating and/or resistive heating/joule heating/ohmic heating. It is also preferred that wherein the second curing step comprises convection heating, IR heating and/or welding treatment, preferably convection heating. Convention heating occurs, for instance, in a paint bake oven often used in the automotive industry.

With regard to the temperatures applied in the first and second curing steps in the method according to the present disclosure, it is preferred that the first temperature in the first curing step is at least 50° C., more preferably at least 60° C. and more preferably at least 70° C. Preferably, the first temperature in the first curing step is less 150° C. and less, preferably 140° C. and less, more preferably 130° C. and less. Thus, it is preferred that the first temperature in the first curing step is in a range of from 50 to 150° C., preferably from 60 to 140° C. and more preferably 70 to 130° C. Similarly, it is preferred that the second temperature in the second curing step is at least 150° C., preferably at least 160° C. and more preferably at least 170° C. Preferably, the second temperature in the second curing step 250° C. and less, preferably 240° C. and less, and more preferably 230° C. and less. Hence, it is preferred that the second temperature in the second curing step is in a range of from 150 to 250° C., preferably from 160 to 240° C. and more preferably 170 to 230° C.

With regard to the substrate or parts connected in the method according to the present disclosure, in general, any kind of substrate or part may be used known in the art to be generally suitable to be bonded by an epoxy adhesive. Preferably, the first and second parts are selected from metal, wood, composite materials such as carbon-fiber composite materials, ceramic and polymeric materials, and any combinations thereof. It is, however, preferred that the first and second parts are selected form metal. The metal is preferably selected from steel, aluminium, magnesium, zinc, titanium, silver, gold, copper, bronze and any alloys made therefrom. For instance, it is preferred that the first and second parts are both selected from steel, which may be covered with a zinc layer, a coating, a paint or laquer layer, or even be covered with oil. This refers to a common situation in a manufacturing process in the automotive industry, for which the method and compositions according to the present disclosure are especially suited. In certain situations in the automotive industry, it may be desirable to bond different metals together, (a) to establish a strong and safe connection between the parts, and (b) to electrically insulate both parts from another to prevent contact corrosion. Both (a) and (b) may be provided for by the methods and compositions disclosed herein. Hence, it is preferred that the first part is steel, and the second part is selected from aluminium, titanium, magnesium or zinc, and any combinations thereof. In a preferred embodiment, the first part is selected from steel, and the second part is selected from aluminium or an aluminium alloy. In another preferred embodiment, the first part is selected from steel, and the second part is selected from magnesium or a magnesium alloy. In yet another preferred embodiment, the first part is selected from steel, and the second part is selected from titanium or a titanium alloy.

Due to the advantageous brought about by the method according to the present disclosure, it is preferred that the method as described herein is a method for bonding parts in an automotive assembly line, bonding parts in aerospace industries, bonding parts in an assembly line for trucks or trains, and bonding parts in marine industries, preferably in an automotive assembly line. Preferably, the method according to the present disclosure is a method for producing a hem flange connection between two parts. Similarly, the method as described herein is a method for bonding parts in a body-in-white process in the automotive industry.

EXAMPLES

The present disclosure is further described without however wanting to limit the disclosure thereto. The following examples are provided to illustrate certain embodiments but are not meant to be limited in any way. Prior to that some test methods used to characterize materials and their properties will be described. All parts and percentages are by weight unless otherwise indicated.

Materials Used:

| Raw Materials -Trade Name | Description/Function |
| --- | --- |
| TTD | Trioxatridecandiamine (EW 55)/Amine Curative |
| PAA | Aliphatic Polyamidoamine (EW 250 g/eq)/Curative |
| ANKAMINE K 54 | Tris-2,4,6-dimethylaminomethyl-phenol (EW 265)/Accelerator |
| Calcium Nitrate Tetrahydrate | $Ca(NO_3)_2 \cdot 4H_2O$/Accelerator |
| Dynasilan GLYEO | Epoxy silane/wetting agent |
| AEROSIL R202 | Fumed silica/thixotropy agent |
| EPIKOTE 828 | Epoxy resin based on diglycidylether of bisphenol-A/basic epoxy |

-continued

| Raw Materials -Trade Name | Description/Function |
|---|---|
| EPONEX 1510 | Hydrogenated DGEBA/oil absorption |
| KANE ACE MX 153 | 33% Core shell Butadiene rubber in DGEBA/Toughener |
| KANE ACE MX 257 | 37% Core shell Butadiene rubber in DGEBA/Toughener |
| SHIELDEX AC 5 | Calcium ion-exchanged amorphous silica/Corrosion inhibitor |
| Weissfeinkalk S40 | Metal oxide/Ground white fine quicklime |
| MIN-SIL 20 SF | Fused silica/filler |
| SIL-CELL 32/ EUROCELL 300H | Mineral extender/Cohesive strength |
| Yellow pigment paste | Pigment/color |
| Glass beads 125 μm | Glass beads/Bondline thickness control |
| Chromophtal blue A3R | Indanthrone |
| Yellow 74 | pigment |

Test Methods

1. Cohesive Strength (Overlap Shear Strength (OLS))

Overlap shear strength was determined according to PV 12.35. Used substrates are based on CR5 steel hot-dip galvanized with oil according VW standard and based on Aluminum TL 094 with dry lube E1. The two-component adhesive composition was applied to one edge of the two panels (i.e., adherents). Bond area was 10 mm×25 mm per sample. Glass beads (90-150 μm in diameter) within the adhesive served as spacers. The bond was closed and the samples were cured as specified in the example.

The bonds were tested to failure in cold conditions (−35° C.+/−2° C.), at room temperature (23+/−2° C.) or at elevated temperature (80+/−2° C.) using a crosshead displacement rate of 10 mm/min. The failure load was recorded, and the lap width was measured with a vernier caliper. The quoted lap shear strengths were calculated as failure load/(measured width of the bond x measured length of the bond). The average and standard deviation were calculated from the results. The overlap shear strength (OLS) values are recorded in Mega Pascal (MPa) and are an average of the results obtained with 5 samples.

OLS @ RT
OLS @ 80° C.
OLS @ −35° C.

2. Dynamic Wedge Impact Test

Crack resistance behaviour is especially important under dynamic conditions, typical of a crash scenario. The adhesives resistance to this scenario is investigated using wedge peel test. The dynamic wedge impact test was performed according to ISO method 11343. The test was performed using a pendulum machine, Pendulum impact tester HIT 450P available from Zwick/Roell. The method is based on driving a wedge into adhesively bonded metal substrates by a pendulum with 2 m/s. Tests were performed at room temperature (23° C.+/−2° C. and 50+/−5% relative humidity). For test assembly preparation a hot dipped galvanized steel strip (commercially available by Rocholl reference CR4 GI 40/40) having a dimension of 100 mm×20 mm×0.8 mm and coated with 3 g/m2 Oil (PL 3802-39s commercially available from Fuchs Petrolub AG, Germany). The example material to be tested was then applied onto the bond area on the first steel strip and covered by a second steel strip having the same dimension as the first. The two strips were then manually pressed together and hereafter clamped together using 2 binder clips along the bond line, in order to hold the test assembly in place. All test assemblies were then cured for 30 minutes at 180° C. in an air circulating oven. Test assemblies were then conditioned for 24 hours at ambient condition 23+/−2° C. and 50+/−5% relative humidity before testing.

The fully cured and conditioned test assemblies were then placed into the pendulum test machine and then a wedge drives with 2 m/s between the two substrates and the adhesive bond line to determine the impact peel properties of the adhesive. During impact the former kinetic energy of the pendulum hammer is partially absorbed within the test assemblies and the degree of energy absorption can be correlated directly with the fracture energy. Per example formulation 3 dynamic wedge impact test assemblies were prepared and the test results averaged. Test results were reported in N/mm.

Example 1: Preparation of Part A and Part B

Parts A of the two-component adhesive composition precursor was prepared by combining the ingredients as listed in table 1 using a highspeed mixer (DAC 150 FVZ Speedmixer, from Hauschild Engineering) with stirring at 3000 rpm. In a first step the liquid components for part A were mixed together for 2 min. Solid parts were added one after the other with mixing for 1 minute at 3000 rpm after each addition. The complete mixture was finally stirred for 4 min at 3000 rpm in the highspeed mixer to ensure complete dispersion of all ingredients.

Part B of the two-component adhesive composition precursor was prepared according to the same procedure as outlined for Part A, but using the ingredients as listed in table 2.

TABLE 1

Composition of part (A), ratios in wt.-%

| Raw Material | % by weight |
|---|---|
| PAA | 50.25 |
| TTD | 7.54 |
| ANKAMINE K54 | 10.05 |
| Calcium Nitrate Tetrahydrate | 4.40 |
| MIN-SIL 20SF | 27.64 |
| Indanthrone | 0.13 |

TABLE 2

Composition of part (B), ratios in wt.-%

| Raw Material | % by weight |
|---|---|
| EPIKOTE 828 | 7.86 |
| EPONEX 1510 | 8.56 |
| KANE ACE MX 257 | 28.54 |
| KANE ACE MX 153 | 28.54 |
| AEROSIL R202 | 3.33 |
| GLYEO | 1.14 |
| SHIELDEX AC 5 | 2.38 |
| WEISSFEINKALK S40 | 2.57 |
| MIN-SIL 20SF | 13.22 |
| SIL-CELL 32/EUROCELL 300H | 2.09 |
| Glass beads 125 μm | 0.95 |
| Yellow pigment 74 paste | 0.80 |

Example 1: Preparation and Testing of Adhesive Composition Comprising Part A and Part B After all raw materials were added, the mixtures were (optionally) degassed and then filled into a corresponding unit of a 1:4 400 ml dual pack cartridge obtained from Sulzer Mixpac, AG, Rotkreuz, Switzerland, (i.e. one unit for part (A), the other unit for part (B)). A mixing nozzle, type "MC 10-24" (for 400 ml 4:1), was fitted to the cartridge. After a dwell time of 12-24 hours, the adhesive composition was extruded onto a metal substrate (both steel and aluminium plates were used), from the cartridge by using a pneumatic dispensing gun at a pressure of 4 bar (400 kPa). Ratios of part (A) and part (B) were generally about 4 to about 1. The mixed adhesive composition applied to the substrate was green.

The colour remained green after curing at room temperature during 24 hrs. The colour changed to red after curing for 30 min at room temperature followed by 40 s at 125° C. induction curing.

The colour of the adhesive turned brown after curing the adhesive for 30 min at room temperature, followed by 40 s induction curing step at 125° C. and 30 min cure at 180° C. The properties of this cured adhesive are shown in table 4.

TABLE 4

Properties of cured adhesive composition (brown adhesive, 180° C. cure)

| Test | Substrate | |
|---|---|---|
| OLS @ RT | CR5 GI Steel | 18.5 MPa |
| OLS @ 80° C. | CR5 GI Steel | 12.0 MPa |
| OLS @ −35° C. | CR5 GI Steel | 22.7 MPa |
| OLS @ RT | Alu TL094 | 25.0 MPa |
| Wedge Impact Peel @ RT | CR4 GI 40/40 Steel | 26.0 N/mm |

Example 2: Preparation and Testing of Adhesive Composition Comprising Part a and Part B The procedure of used for example 1 was followed. The ingredients of part (A) are listed in table 5, and the ingredients for part (B) are listed in table 6.

TABLE 5

Composition of part (A), ratios in wt.-%

| Raw Material | % by weight |
|---|---|
| PAA | 50.25 |
| Polyetheramine | 7.54 |
| ANKAMINE K54 | 10.05 |
| Calcium Nitrate Tetrahydrate | 4.40 |
| MIN-SIL 20SF | 27.64 |

TABLE 6

Composition of part (B), ratios in wt.-%

| Raw Material | % by weight |
|---|---|
| DGEBA | 8.56 |
| EPONEX 1510 | 8.56 |
| KANE ACE MX 257 | 28.54 |
| KANE ACE MX 153 | 28.54 |
| AEROSIL R202 | 3.33 |
| GLYEO | 1.14 |
| SHIELDEX AC 5 | 2.38 |
| WEISSFEINKALK S40 | 2.57 |
| MIN-SIL 20SF | 15.22 |
| SIL-CELL 32/EUROCELL 300H | 2.09 |
| Glass beads 125 μm | 0.95 |
| Yellow pigment 74 paste | 0.1 |

After all raw materials were added, the mixtures were (optionally) degassed and then filled into a corresponding unit of a 1:4 400 ml dual pack cartridge obtained from Sulzer Mixpac, AG, Rotkreuz, Switzerland, (i.e. one unit for part (A), the other unit for part (B)). A mixing nozzle, type "MC 10-24" (for 400 ml 4:1), was fitted to the cartridge. After a dwell time of 12-24 hours, the adhesive composition was extruded onto a metal substrate (both steel and aluminium plates were used), from the cartridge by using a pneumatic dispensing gun at a pressure of 4 bar (400 kPa). Ratios of part (A) and part (B) were generally about 4 to about 1. The adhesive was extruded as a viscous film having a thickness of about 0.4 mm and had a yellow colour. The substrate was heated up to about 100° C. for about 20 s by means of induction. After allowing the substrate/adhesive to cool down to room temperature, the adhesive was inspected. While the adhesive was secured tightly onto the metal surface, the open surface of the adhesive was elastic and tacky and still had the initial yellow colour. Cutting the adhesive open and visually inspecting the cut between the adhesive/substrate-conjunction and the open surface of the adhesive revealed the following: on the adhesive/substrate conjunction, there was already cured adhesive, indicated by a dark red colour of the cured adhesive. On the surface and up to a certain depth of the adhesive layer, there was still the yellow colour indicating the uncured adhesive. Between the dark red colour at the bottom and the yellow colour at the top, there was a gradient between these two colours, indicating the presence of a curing gradient. After that, a second metal part was applied to the open surface of the adhesive, and induction heating was again applied for 25 s at about 100° C. The assembly obtained thereby showed excellent handling strength. Final cure of 30 min at 180° C. in a standard oven finalized the assembly. On aluminium surfaces, shear strength of about 19 MPa and on steel surfaces of about 16.5 MPa were obtained. For both aluminium and steel, cohesive failure modes were obtained.

The invention claimed is:

1. A method for bonding parts, comprising the following steps:
    (a) providing a two-component adhesive composition precursor, comprising
        a first part (A) comprising at least one epoxy curing agent and at least one first dye;
        a second part (B) comprising at least one second dye different from the at least one first dye and at least one epoxy resin;
    (b) mixing part (A) and part (B) of the two-component adhesive composition precursor so as to obtain an adhesive composition;
    (c) applying the adhesive composition onto a first part;
    (d) applying a second part onto the adhesive composition applied to the first part;
    (e) performing a first curing step at a first temperature in a range from 50 to 150° C., wherein the adhesive composition undergoes a first colour change;
    (f) performing a second curing step at a second temperature higher than the first temperature, thereby fully curing the adhesive composition so as to obtain a structural adhesive bond between the first and second parts, wherein the adhesive composition undergoes a second colour change.

2. Method according to claim 1, wherein the first and/or second dye is able to undergo a colour-change.

3. Method according to claim 1, wherein the first dye and/or the second dye are selected from halochromic dyes.

4. Method according to claim 1, wherein the first dye and/or the second dye are selected from azo dyes.

5. Method according to claim 4, wherein the azo dyes are selected from methyl red, methyl orange, cresol red, erichrome black T, thymol blue, bromothymol blue, and arylide yellow.

6. Method according to claim 1, wherein the first dye exhibits a colour different from the colour of the second dye.

7. Method according to claim 1, wherein the first dye is selected from organic dyes and/or inorganic pigments.

8. Method according to claim 1, wherein the first and/or second curing step comprises a heating treatment selected from induction heating, convection heating, IR heating, ultrasonic treatment, microwave heating, laser treatment, welding treatment and/or resistive heating/joule heating/ohmic heating, and any combination therefrom.

9. Method according to claim 1, wherein the first temperature in the first curing step is in a range of from 60 to 140° C.

10. Method according to claim 1, wherein the second temperature in the second curing step is in a range of from 150 to 250° C.

11. Method according to claim 1, wherein the first colour change is from green to red, yellow to red, yellow to green, green to orange, green to yellow, yellow to blue, blue to yellow, red to blue or blue to red.

12. Method according to claim 1, wherein the first and second parts are selected from metal, wood, composite, ceramic and polymeric materials.

13. Method according to claim 12, wherein the first and second parts are metal.

14. Method according to claim 12, wherein the metal of the first part is different from the metal of the second part.

15. Method according to claim 1, wherein the method is a method for bonding parts in an automotive assembly line, bonding parts in aerospace industries, or bonding parts in marine industries.

* * * * *